United States Patent

[11] 3,571,501

[72] Inventor Keisuke Yamamoto
Hirakata-shi, Japan
[21] Appl. No. 735,626
[22] Filed June 10, 1968
[45] Patented Mar. 16, 1971
[73] Assignee Matsushita Electric Industrial Co., Ltd.
Osaka, Japan
[32] Priority Sept. 18, 1967, Feb. 26, 1968, Feb. 26, 1968, Feb. 26, 1968
[33] Japan
[31] 42/60394, 43/12717, 43/12718, 43/12719

[54] ON SCREEN TUNING INDICATOR DEVICE FOR TELEVISION RECEIVER

6 Claims, 1 Drawing Fig.

[52] U.S. Cl. .......... 178/5.8, 307/237, 307/261
[51] Int. Cl. .......... H04n 5/50, H03k 5/00
[50] Field of Search .......... 178/6 (Tuning), 7.5 (E), 5.8 (A), 5.8; 325/455; 307/237, 261, 265, 268

[56] References Cited

UNITED STATES PATENTS

| | | | |
|---|---|---|---|
| 3,475,622 | 10/1969 | Andersen et al. | 307/235 |
| 3,497,723 | 2/1970 | Nelson | 307/268 |
| 2,904,630 | 9/1959 | Bruch et al. | 178/7.5E |

OTHER REFERENCES

" New Color-TV Tuning Indicator" by Walter H. Buchsbaum Electronics World December, 1967 pages 68 & 69

" Pix Tube as Tuning Eye" by A.V.J. Martin Electronics World July 1960 pages 46 & 94

*Primary Examiner*—Richard Murray
*Assistant Examiner*—George G. Stellar
*Attorney*—Stevens, Davis, Miller & Mosher

ABSTRACT: This specification discloses a tuning indicator device for a television receiver, wherein a waveform having a slope depending upon the horizontal or vertical synchronizing circuit is sliced at upper and lower levels in accordance with a voltage which depends upon the state of tuning, and a rectangular wave is formed from the sloped portion of said sliced waveform to be indicated on the picture tube screen as a tuning indication signal.

Patented March 16, 1971 3,571,501

6 Sheets-Sheet 1

INVENTOR

KEISUKE YAMAMOTO

BY Stevens, Davis, Miller & Mosher

ATTORNEYS

Patented March 16, 1971 3,571,501

6 Sheets-Sheet 2

INVENTOR
KEISUKE YAMAMOTO

BY Stevens, Davis, Miller & Mosher

ATTORNEYS

INVENTORS
KEISUKE YAMAMOTO

BY

ATTORNEYS

INVENTOR

KEISUKE YAMAMOTO

BY Stevens, Davis, Miller & Mosher

ATTORNEYS

INVENTOR

KEISUKE YAMAMOTO

BY

ATTORNEYS

INVENTOR

KEISUKE YAMAMOTO

BY

ATTORNEYS

ON SCREEN TUNING INDICATOR DEVICE FOR TELEVISION RECEIVER

This invention relates to a tuning indicator device for television receivers, and more particularly it pertains to such a device which is capable to of a tuning indication on the picture tube screen without using any oscillator circuit.

In general, a radio r wave arriving at an antenna is mixed with a oscillation frequency in a tuner to be converted to a video intermediate frequency which in turn in supplied to a video amplifier through a video intermediate frequency amplifier. The overall characteristics occuring in the portion between the antenna terminal and the input of the video amplifier or output of a second detector are as shown in FIG. 1. Take channel five of the Japanese frequency allotment, for example. The carrier is at 177.25 m.c.p.s. color subcarrier at 180.83 white 1 m.c.p.s. and sound signal at 181.75 m.c.p.s. In a color television receiver, the sound signal component tends to be modulated with the color subcarrier if it is too great, so that there occurs a beat at 920 k.c.p.s. (4.5—3.58 = 0.92 m.c.p.s.). To avoid such a beat, it is a practice to attenuate the sound signal component by 50—60 db. Because of the very sharp characteristics of such a sound trap, the local oscillation frequency should be accurately adjusted. Otherwise, the attenuation will be decreased so that the resulting picture will be adversely affected thereby. In a black and white television receiver, such a beat rarely occurs because of the low attenuation by the sound trap. Therefore, if the local oscillation frequency is deviated by about 1 m.c.p.s., the distinction of the resulting picture will not be deteriorated substantially. Another important aspect of a color television receiver is that the depth of color is greatly varied for a change of a few tens of k.c.p.s. in the local oscillation frequency since the position of the subcarrier, which refers to the ratio of the gain at the subcarrier frequency to a maximum of the overall gain, is in the sloped portion of the characteristic curve where great changes in gain occur.

Needless to say, each circuit is adapted for such automatic control as to maintain the output level constant by automatically changing the gain. Actually, however, it is almost impossible to follow a change of 20 db. or more in an input signal since the loop gain of the automatic control is of a definite value. As the local oscillation frequency increases. the overall characteristics will be shifted parallelly toward lower frequency positions. In other words, if the gain of the sound signal is increased, the subcarrier will be concurrently shifted to a higher gain position. Thus, while the picture is being viewed, it is observed that a beat occurs to increase the depth of color so that the image becomes susceptible to an overshoot because of the attenuation of the carrier position. On the other hand, if the local oscillation frequency is decreased, the sound signal gain is increased, but such gain is much lower than that achieved in the case where the local oscillation frequency is deviated toward a higher frequency position, so that no remarkable beat occurs in the picture. In this case, however, the subcarrier gain is also decreased so that the depth of color is decreased. A deviation up to 500 — 1000 k.c.p.s. of the local oscillation frequency results in a fading-out of color. Furthermore, the picture is blurred since the higher frequency component of the video signal is attenuated due to an increase in carrier gain.

As will be appreciated from the foregoing description, any deviation of the local oscillation frequency should be prevented not only in a color television receiver but also in a black and white television receiver.

In a conventional tuning indicator device, an indicator tube 2 is connected with the output terminal of an IF detector circuit 1, as shown in FIG. 2. However, such conventional device is disadvantageous in that it is necessary to separately provide the indicator tube 2. On the other hand, in such devices using a cathode ray tube as indicator tube, there is provided an oscillator circuit. However, the provision of such oscillator circuit makes it difficult to compensate for variations in the temperature characteristic and power supply voltage characteristic, for aging of the components, etc., and in order to stabilize the operation, a variety of correcting circuits are needed.

It is a primary object of this invention to provide a tuning indicator device for producing tuning indication on the picture tube screen of a television receiver.

Another object of this invention is to provide a tuning indicator device for causing a color synchronization indicating signal to appear on the picture tube screen.

Still another object of this invention is to provide a tuning indicator device wherein a waveform having a slope such as a sawtooth wave or a triangular wave is sliced by means of a diode to cause a rodlike tuning indicating signal to appear on the picture tube screen, thereby producing a similar effect to that produced by the use of a magic eye.

A further object of this invention is to provide a tuning indicator device wherein tuning indication in the form of a rod is present at the center of the picture tube screen when adjusting the local oscillation frequency.

Other objects, features and advantages will become apparent from the following description taken in conjunction with the accompanying drawings, in which.

Figure 1:
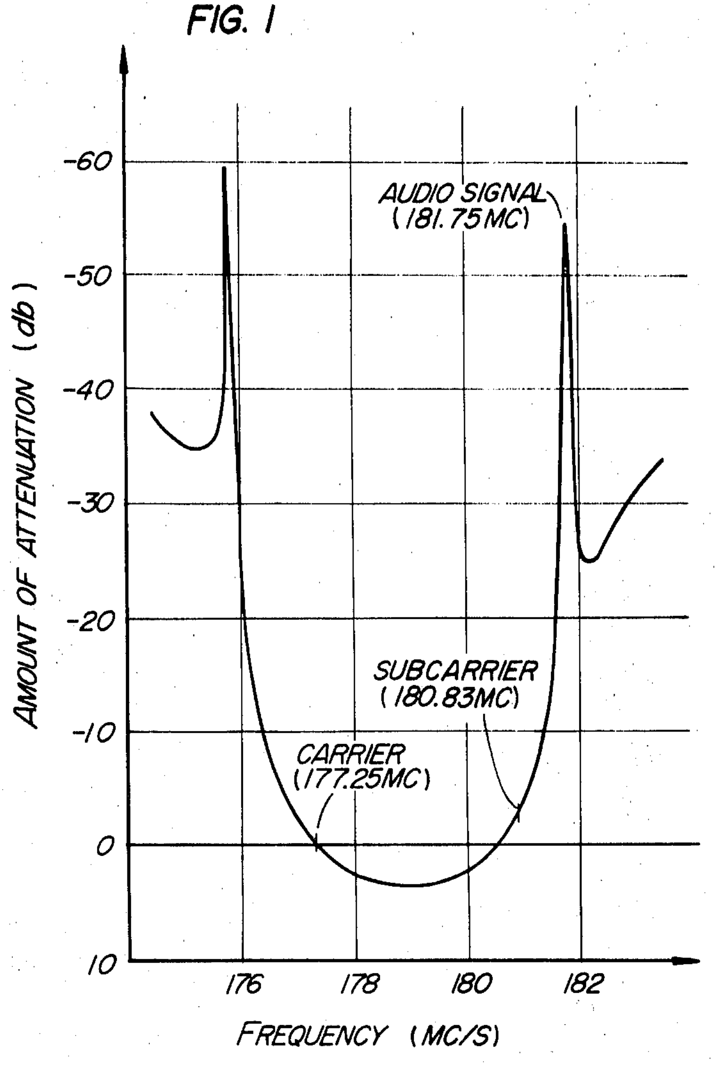
FIG. 1 shows the overall frequency characteristics of a color televiso television receiver occurring in the portion between the antenna terminal and the output of a second detector.
Figures 2, 3:
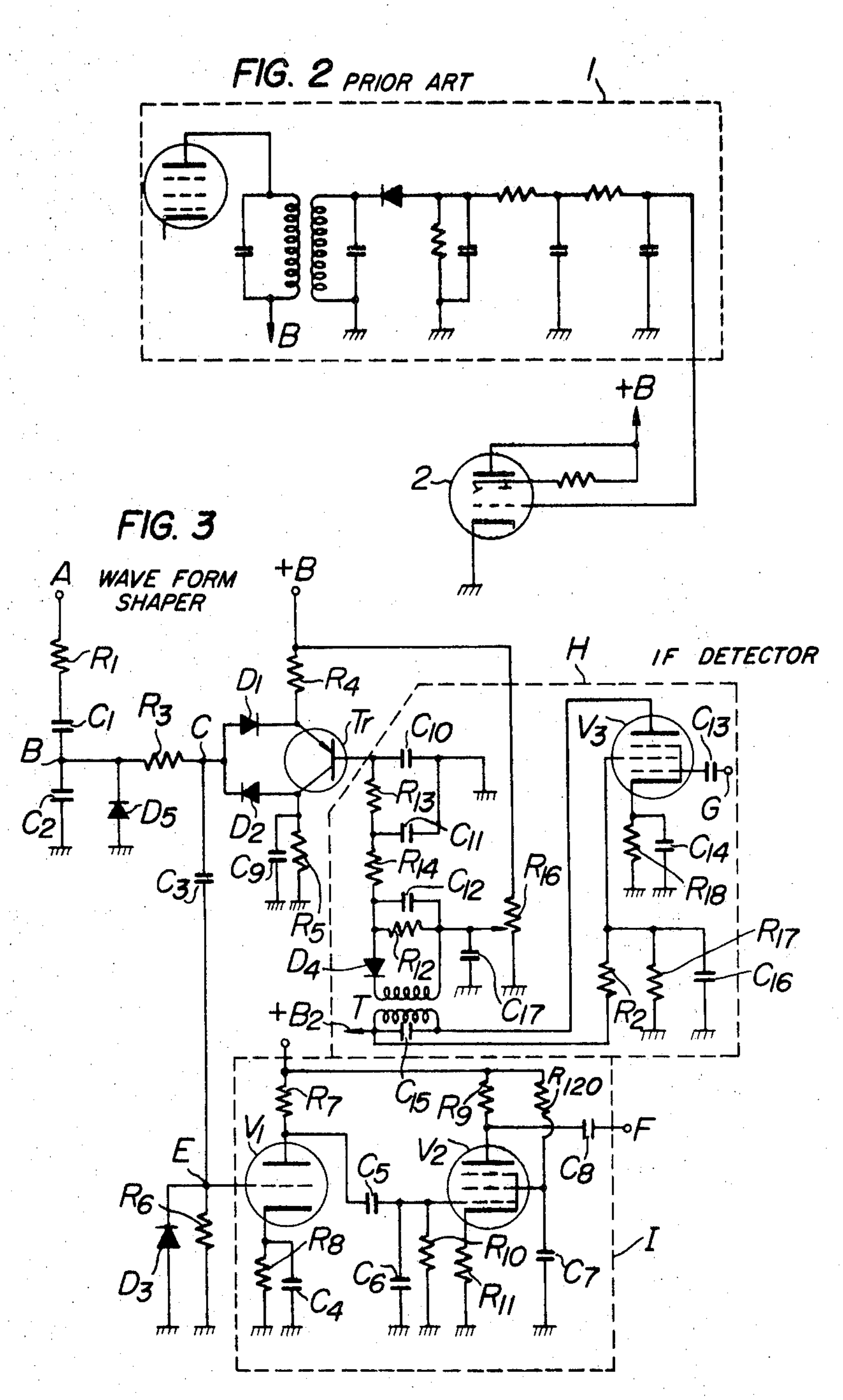
FIG. 2 is a circuit diagram of a conventional tuning indicator device.
FIG. 3 is a circuit diagram showing the tuning indicator device for a television receiver according to an embodiment of this invention invention.
Figures 6A, 6B:
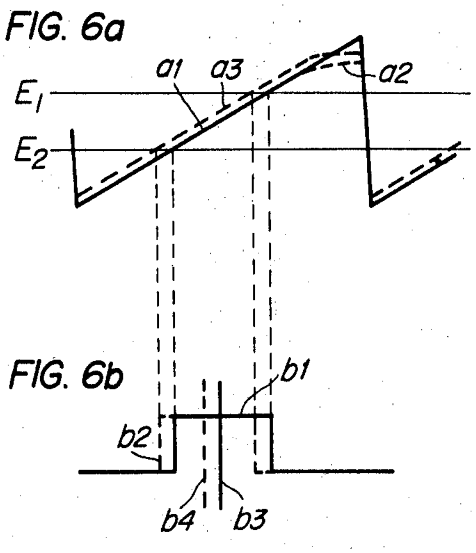
Figure 7:
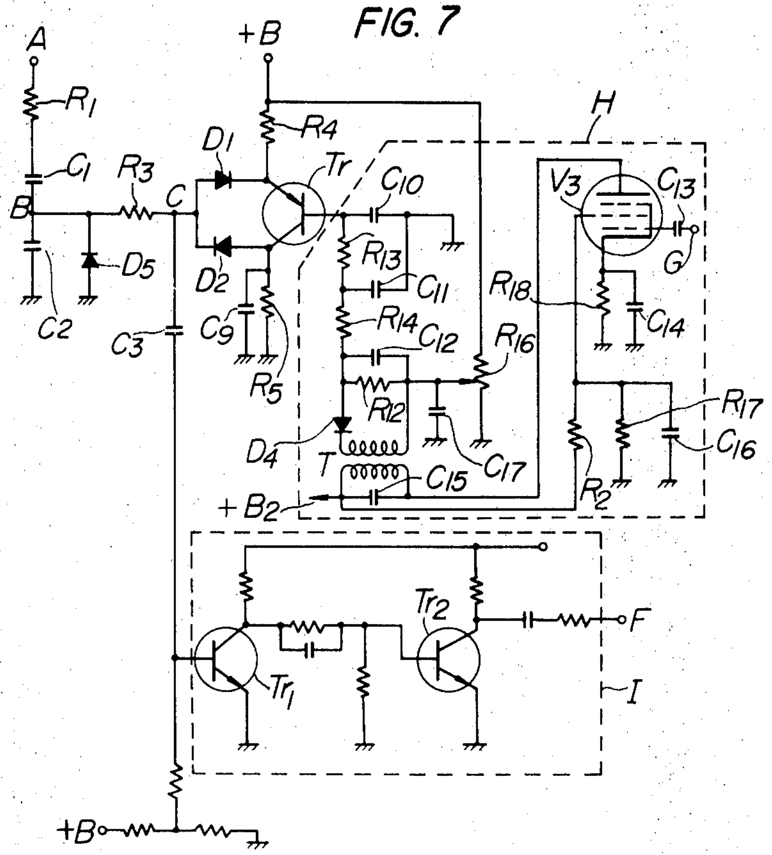

FIGS. 6*a* and 6*b* show waveforms useful for explaining the operation of the circuit shown in FIG. 3;

FIG. 7 is a circuit diagram showing a second embodiment of this invention; and

Figure 8:
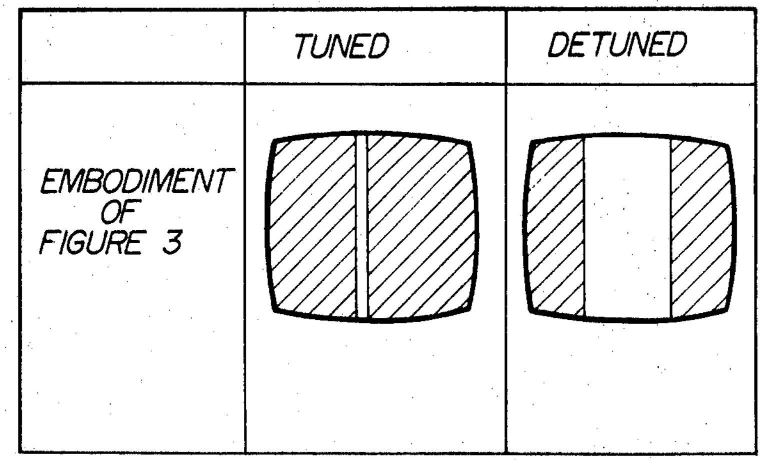

FIG. 8 is a view showing the manner in which the tuning indication is produced on the screen of a cathode-ray tube.

The present invention will be described in greater detail with reference to the drawings.

Referring now to FIG. 3, A represents a terminal to which the grid voltage of a horizontal output tube is applied. The terminal A is grounded through a series circuit of a resistor $R_1$ and capacitors $C_1$ and $C_2$. A clamping diode $D_5$ is connected in parallel with the capacitor $C_2$, with the anode thereof grounded. The cathode of the diode $D_5$ is connected with the emitter and the collector of a transistor $T_r$ through a series circuit of a resistor $R_3$ and a diode $D_1$ and that of the resistor $R_3$ and a diode $D_2$ respectively. The cathode of the diode $D_1$ is connected with the emitter of the transistor $T_r$, the anode of the diode $D_2$ is coupled to the collector of the transistor R $T_r$, and the anode of the diode $D_1$ and the cathode of the diode $D_2$ are connected with each other. The emitter of the transistor $T_r$ is supplied with a power source voltage + B (about 25 v.) through a resistor $R_4$, and the collector thereof is grounded through a parallel circuit of a capacitor $C_9$ and a resistor $R_5$. The base of the transistor $T_r$ is connected with the output terminal of an intermediate-frequency detector stage H. The relationship between the resistors $R_3$, $R_l$ *4 and* $R_l$ *5 is such that the value for the resistor* $R_l$ *3 is greater than those for the resistors* $R_4$ and $R_5$. The intermediate frequency detector stage H is similar to a conventional arrangement comprising a vacuum tube $V_3$, capacitors $C_{10}$, $C_{11}$, $C_{12}$, $C_{13}$, $C_{14}$, $C_{15}$, $C_{16}$and $C_{17}$, resistors $R_2$, $R_{12}$, $R_{13}$, R $_{14}$, $R_{17}$and $R_{18}$, diode $D_4$ and transformer T except that one end of the resistor $R_{12}$ is connected with a movable terminal of a variable resistor $R_{16}$ inserted between power source and ground. The amplifier tube $V_3$ has its screen grid maintained at as low a voltage as a few tens of volts so that it may produce sufficient limiter action, thus making it possible to always obtain a constant detection output. The detection output contains video signal components, and therefore it is passed through the filter formed by the resistors $R_{12}$, $R_{13}$ and $R_{14}$ and capacitors $C_{10}$, $C_{11}$ and $C_{12}$ to eliminate high-frequency components and video signal. Thus, the DC voltage detected is applied to the base of the transistor $T_r$. Such detected DC voltage is of a negative value, and its absolute value becomes high in the tuned state while it becomes low in the detuned state. Connection point C between the diodes $D_1$ and $D_2$ is grounded through a differentiating circuit formed by capacitor $C_3$ and resistor $R_6$, and the diode $D_3$ is connected in parallel with the resistor $R_6$ one end of which is connected with the input terminal of an amplifier circuit I which is a conventional two-stage amplifier circuit composed of amplifier tubes $V_1$ and $V_2$, resistors $R_7$, $R_8$, $R_9$, $R_{10}$, $R_{11}$ and $R_{12}$ and capacitors $C_4$, $C_5$, $C_6$, $C_7$ and $C_8$. Output terminal F of the amplifier circuit is connected with the grid of a color difference signal amplifier tube in the case of a color television receiver.

Description will now be made of the operation of the device. Sawtooth waves for driving the horizontal output tube are applied to the terminal A so that they are shaped by means of capacitors $C_1$ and $C_2$ and diode $D_5$. It is desirable that the waveform occurring at a point B be a complete sawtooth one, and it is also required that the amplitude of the waveform be higher than the maximum collector-emitter voltage of the transistor $T_r$.

As described above, when the local oscillation frequency is tuned, the detection output of the intermediate frequency detector stage H becomes a maximum negative voltage, while when it is detuned, such output is a small negative voltage, and when the local oscillation frequency is completely detuned, the output becomes zero volts. When the transistor $T_r$ is a PNP type one as shown in the drawing, the lower the base voltage, the higher the base current. Thus, in the tuned state, there flows an increased base current, so that the emitter and collector currents are also increased. When the saturation region of the transistor $T_r$ is reached, the three elements, or the collector, emitter and base of the transistor will assume substantially the same potential. As the local oscillation frequency is gradually detuned, the emitter current will decrease. When the transistor is completely cutoff the emitter voltage becomes the same as the voltage +B, and the collector voltage becomes zero. The variable resistor $R_{16}$ is provided for the purpose of effecting adjustment so that the saturation region of the transistor is reached when the completely tuned state is attained. That is, the movable tap of the variable resistor $R_{16}$ is so cone connected as to provide a bias to the IF detection output so that the cutoff region of the transistor $T_r$ is approached as the local oscillation frequency is further detuned. It is to be noted that the present invention intends to reliably utilize the resulting collector and emitter voltages of the transistor $T_r$. That is, the sawtooth wave occurring at the point C is produced by slicing the top and bottom portions of the waveform occurring at the point B by means of the diodes $D_1$ and $D_2$ respectively. Obviously, the levels at which the waveform occurring at the point B is to be sliced as described above correspond to the collector and emitter voltages of the transistor $T_r$.

The slicing condition will now be described in greater detail. If the levels to be sliced or emitter and collector potentials of the transistor $T_r$ are $E_1$ and $E_2$ respectively, that portion of the sawtooth wave which is higher than $E_1$ renders the diode $D_1$ conductive and the diode D2 nonconductive. Thus, the amplitude $S1$ of the waveform occurring at the point C which is higher than $E_1$ is given by $$S_1=\frac{R_4}{R_3+R_4}\times S\doteqdot\frac{R_4}{R_3}\times S$$

where $S$ is the amplitude of the sawtooth wave which is higher than $E_1$. $S_1$ is very small as compared with $S$ since $R_3>>R_4$. This means that the sawtooth wave is sliced at the level of $E_1$.

That portion of the sawtooth wave which is between $E_1$ and $E_2$ renders both of the diodes $D_1$ and $D_2$ nonconductive, and therefore the waveform occurring at the point C becomes the same as that at the point B.

That portion of the sawtooth wave which is lower than $E_2$ renders the diode $D_2$ conductive and the diode $D_1$ nonconductive. Thus, the amplitude $S_2$ *of the waveform portion which is lower than* $E_2$ *is given by*

$$S_2=\frac{R_5}{R_3+R_5}\times S\doteqdot\frac{R_5}{R_3}\times S$$

$S_2$ becomes very small as compared with $S$ since $R_3>>R_5$. This means that the sawtooth wave is sliced at the level of $E_2$. In this way, the sawtooth wave is vertically symmetrically sliced depending upon the base potential of the transistor $T_r$.

The sawtooth wave is sliced at the top and bottom portions as described above, but if a sawtooth wave with an improved linearity as shown at al in FIG. *6a* is applied, then the top portion of the sawtooth wave tends to be curved as shown at *a2* in FIG. *6a*. This is due to the fact that any change in the base potential of the transistor $T_r$ results in a change in internal resistance of the transistor $T_r$ so that the impedance as viewed from the point B toward the transistor $T_r$ is changed. In the absence of the clamping diode $D_5$, the average level of the sawtooth wave is shifted upwardly or downwardly with respect to the slice levels $E_1$ and $E_2$, as shown at *a3* in FIG. *6a, A*, so that the centerlines of the signals available from the bottom of FIG. 3 (signals as shown at *b1* and *b2* in FIG. *6b*) are shifted to positions *b3* and *b4*, respectively, as shown in FIG. *6b*. Thus, when a tuning indication is produced on the picture tube screen, the center of the indication is undesirably displaced with variations in the width thereof. In accordance with the present invention, the clamping diode $D_5$ is provided for the purpose of preventing the upward and downward displacement of the sawtooth wave to thereby prevent the center of the tuning indication on the picture tube screen from being shifted.

Figure 5:
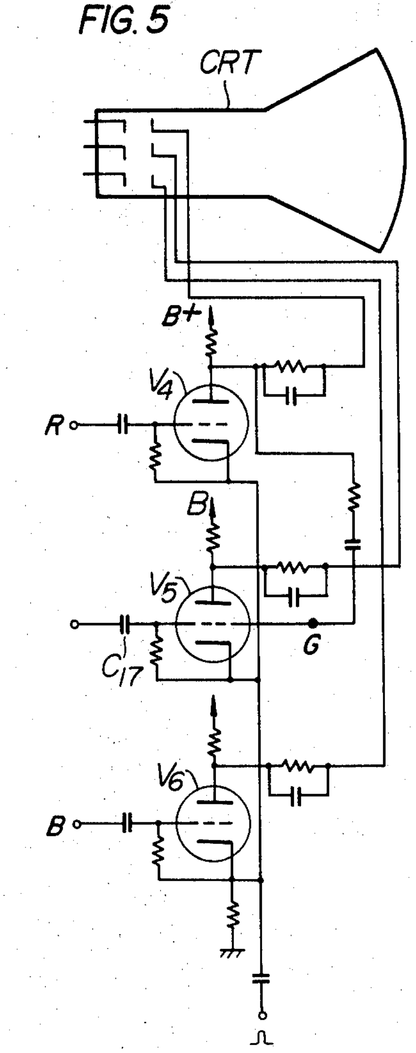
FIG. 5 is a circuit diagram showing an example of a circuit to which the output of the circuit shown in FIG. 3 is supplied.

Description will be made of an example of the circuit arrangement for supplying the signal available at a terminal F to the grids of color difference signal amplifiers. As shown in FIG. 5, a matrix circuit is constituted by an amplifier tube $V_4$ for (R − Y), amplifier tube $V_5$ for (G − Y) and amplifier tube $V_6$ for (B − Y), and the terminal F (FIG. 3) is connected with the grid of the amplifier tube $V_5$ for (G − Y). Output signals of an x-axis demodulator and a y-axis demodulator are applied to grid terminal R of tube $V_4$ and grid terminal B of tube $V_6$ respectively and a signal at the anode of tube $V_4$ is applied to one grid terminal G of tube $V_5$ and thus, these constitute a matrix circuit.

Figure 4:
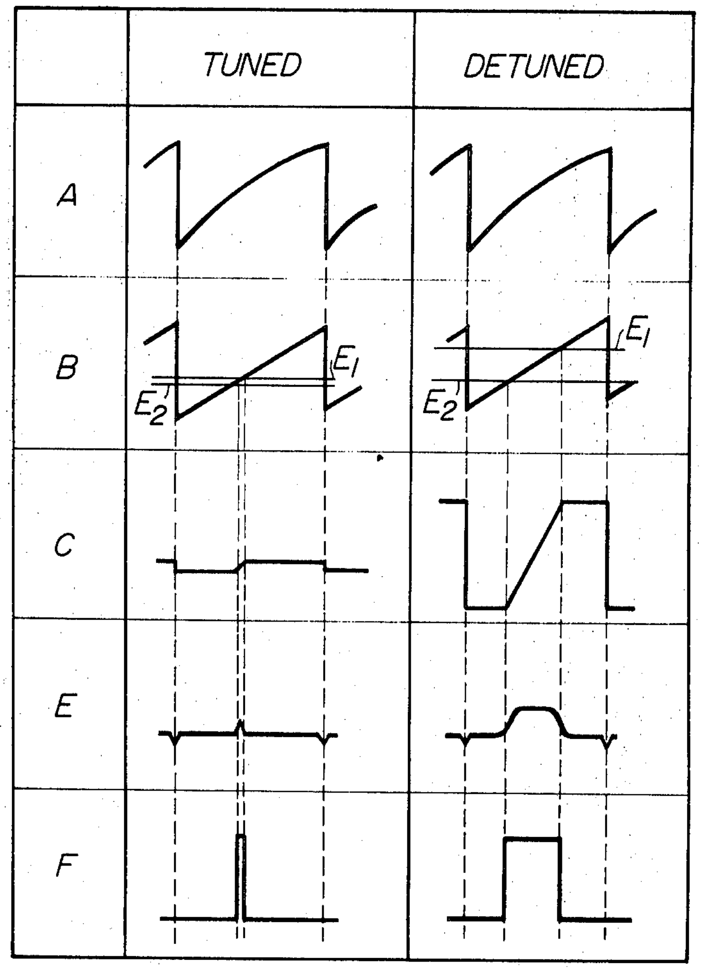
FIG. 4 shows the waveforms which occur at the various positions in the circuit of FIG. 3 as tuned and detuned.

With such an arrangement, upon application of a rectangular wave shown at F in FIG. 4, only the (G − Y) amplifier tube $V_5$ is rendered nonconductive, while the remaining (R − Y) and (B − Y) amplifier tubes $V_4$ and $V_6$ are made conductive so that their outputs are supplied to the corresponding grids of a picture tube CRT. Consequently, the center portion of the picture becomes magenta, and the remaining portions turn out to be greenish.

By taking out at the terminal F an input waveform entering the first grid of tube $V_2$ as in FIG. 3, it is possible to obtain pulses of reverse polarity or negative-going pulses. If such pulses are imparted to the (G − Y) amplifier tube, then the amplifier tube is cut off so that positive-going pulses occur at the plate thereof. Thus, it is possible to produce a green indication on the screen. The remaining portions to become predominantly magenta. The reason why they remaining portions become the complement in color of the central portion is that the output rectangular wave is imparted to the color difference amplifiers through capacitors so that the zero level is changed depending upon the pulse width. That portion of the waveform which is above the zero level represents the green color, while that portion of the waveform which is below the zero level represents the magenta color. From this, it will be seen that with increasing pulse width, magenta occurs.

By differentiating the waveform sliced in the above manner with the aid of the capacitor $C_3$ and resistor $R_6$, the waveform occurring at a point E is md made rectangular. The diode $D_3$ serves to eliminate a great negative spike resulting from the differentiation by the capacitor $C_3$ and resistor $R_6$. Since such negative spike occurs during the horizontal retrace interval of the horizontal scan, the amount of DC restoration tends to be changed when the output waveform amplified by the amplifier tubes $V_1$ and $V_2$ is applied to the color difference amplifiers. In order to maintain the amount of DC restoration constant, therefore, the diode $D_3$ is required. Amplifier tubes $V_1$ and $V_2$ are provided to amplify the waveform occurring at the point E while at the same time making the rise-up of the waveform sharp, and therefore the two-stage amplifying action is not essentially required. It is also possible that such tubes may be replaced with transistors $T_{r1}$ and $T_{r2}$, as shown in FIG. 7. FIG. 4 shows the waveforms occurring at the a various positions in the tuned and detuned states respectively. In the tuned state, the width of the pulses available at the terminal F is small, while in the detuned state, it is large. Thus, by applying such pulses to the color difference amplifiers, it is possible to achieve a tuning indication, as shown in FIG. 8.

The tuning indicator circuit may operate only when adjusting the local oscillation frequency, and it is necessary to cut off the circuit during normal operation since it is not needed. The waveform entering the terminal A may be a sawtooth wave available from the vertical output circuit rather than that from the horizontal output circuit.

As described above, in accordance with the present invention, no self-oscillating circuit is used so that the operation can be made accurate, stable and reliable and the circuit arrangement can relatively be simplified. Furthermore, it is not necessary to provide any separate tuning indicator tube. Yet, it is possible to easily achieve accurate tuning as in the case where use is made of a magic eye, since a tuning indication signal is indicated on the picture tube screen by way of variations in the width of a rodlike signal.

I claim:

1. A tuning indicator device for a television receiver comprising:
- means for producing a voltage in accordance with the state of tuning which assumes a maximum value in the tuned state;
- means for developing a signal waveform having a slope, the frequency of which depends on the repetition frequency of an output of a deflection circuit;
- means for slicing said sloped waveform signal at upper and lower levels which are determined in accordance with said voltage;
- waveform shaping circuit means for generating a rectangular wave having a width corresponding to the length of the sloped portion of said sliced waveform; and
- means for indicating the rectangular wave derived from said waveform shaping circuit as a tuning signal on a screen of a picture tube of said television receiver.

2. A tuning indicator device for a television receiver according to claim 1, further comprising means for applying a rectangular wave derived from said waveform shaping circuit to a demodulator tube, thereby indicating the tuning signal on the screen of the picture tube.

3. A tuning indicator device for a television receiver according to claim 1, wherein said means for slicing said signal includes a transistor having a plurality of electrodes, to the base electrode of which is applied said voltage, a first resistor inserted between a first one of the remaining electrodes of said transistor and ground, a second resistor inserted between a second one of the remaining electrodes of said transistor and a power supply voltage, two diodes connected with said first and second remaining electrodes of said transistor in reverse polarity relationship with each other, the other ends of said two diodes being connected with each other; means for applying sawtooth waves at the connection point between said two diodes through a third resistor; and means for deriving a sliced signal from the connection point between said two diodes to generate a rectangular wave having a width corresponding to the length of the sloped portion of said sliced waveform.

4. A tuning indicator device for a television receiver according to claim 3, wherein the value for said third resistor is selected to be substantially larger than those for said first and second resistors.

5. A tuning indicator device for a television receiver according to claim 3, further including a clamping diode for clamping the sawtooth wave, said clamping diode being disposed between the end of said third resistor at which the sawtooth wave arrives and ground.

6. A waveform shaping circuit comprising:
- a transistor having first and second electrodes and a base electrode;
- said base electrode being connected with a voltage supplying means for determining levels at which a sawtooth wave signal is sliced;
- a first resistor disposed between said first electrode and ground;
- a second resistor disposed between said second electrode and a power source;
- two diodes connected at their one ends with said first and second electrodes of said transistor in reverse polarity relationship with each other;
- a connection point at which the other ends of said two diodes are connected to each other, thereby constituting an output electrode of said circuit; and
- a third resistor connected to said connection point at its one end and having a resistance value which is substantially greater than those of said first and second resistors, the other end thereof being supplied with said sawtooth wave signal, whereby said sawtooth wave signal is sliced at upper and lower levels in accordance with a potential applied at said base electrode.